Figure 1:
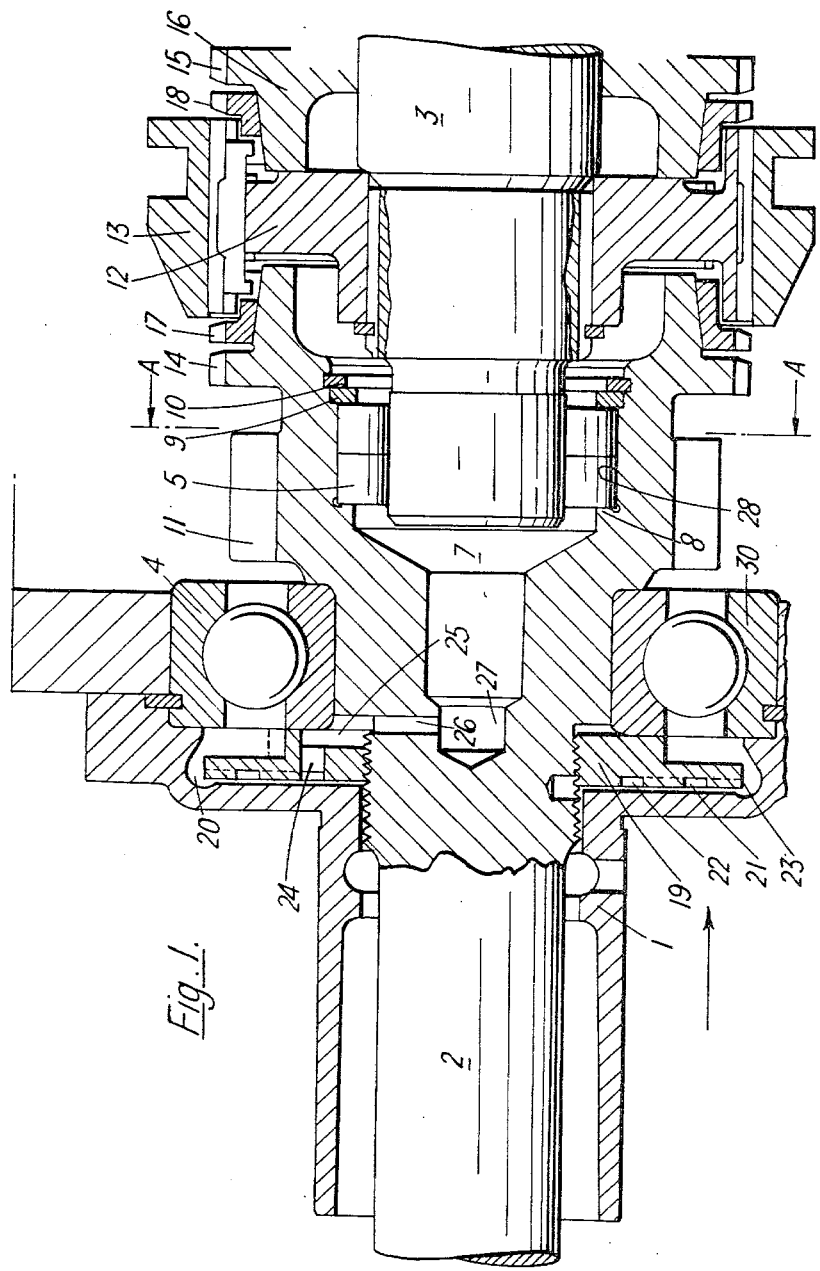

Dec. 14, 1965 T. C. F. STOTT 3,223,196
MOTOR VEHICLE GEARBOX AND PUMP
Filed Dec. 21, 1962 2 Sheets-Sheet 1

Inventor
Thomas Charles Felix Stott
BY
*A. M. Heiter*
Attorney

Dec. 14, 1965  T. C. F. STOTT  3,223,196
MOTOR VEHICLE GEARBOX AND PUMP
Filed Dec. 21, 1962  2 Sheets-Sheet 2

Inventor
Thomas Charles Felix Stott
BY
Attorney

United States Patent Office 3,223,196
Patented Dec. 14, 1965

3,223,196
MOTOR VEHICLE GEARBOX AND PUMP
Thomas Charles Felix Stott, Harpenden, England, assignor to General Motors Corporation, Detroit, Mich., a corporation of Delaware
Filed Dec. 21, 1962, Ser. No. 246,401
Claims priority, application Great Britain, Jan. 8, 1962, 656/62
15 Claims. (Cl. 184—6)

This invention relates to motor vehicle gearboxes in which the end of the mainshaft is journalled in an axial bore in the drive shaft, and to an oil pump which is suitable for use in such a gearbox.

If there is direct drive in top gear and reduction drive in the lower gears in such a gearbox, relative rotation between the drive shaft and mainshaft occurs only in the latter gears, which are engaged for only a small proportion of the time the vehicle is being driven. If however, there is indirect drive, for example over-drive, between the drive shaft and mainshaft in top gear, there is relative rotation between the two shafts for the majority of the time the vehicle is travelling. This relative rotation may lead to failure of the mainshaft journal bearing in the drive shaft bore unless special arrangements are made to lubricate the bearing.

It has been proposed to lubricate such a bearing by forcing oil from an oil sump inwardly into the bore in the drive shaft by the conjoint use of a single spiral groove formed in a stationary plane surface of the gearbox casing and a disc fixed to the drive shaft so that there is a small clearance between the groove and disc. The disc, as it rotates, drags oil around with it and thus forces the oil to travel inwardly along the spiral groove into the bore in the drive shaft.

It has now been discovered that more oil is supplied to the drive shaft bore, and that such small clearances are not necessary, if a plurality of grooves are formed in a disc-like pump impeller fixed to the drive shaft, and the cooperating surface is a plane stationary surface on the gearbox casing.

Thus in the gearbox according to the invention a mainshaft is journalled in an axial bore in a rotary drive shaft; a pump impeller disc is fixed to the drive shaft and has in one face grooves extending with an inward radial component from the outer edge of the impeller disc in the opposite direction to the normal direction of rotation of the drive shaft; part of the outer edge of the impeller disc extends into an oil sump; the impeller disc and drive shaft have channels for conducting oil from the grooves to the mainshaft journal bearing in the axial bore; and a plane stationary surface adjacent the grooved face of the impeller disc exerts a drag on oil scooped into the outer ends of the groove such that the oil is moved inwardly along the grooves into the channels as the impeller rotates.

The grooves, which are preferably each a small part of a spiral, advantageously terminate in an annular collecting channel, and axially extending channels connect the collecting channel to the axial bore.

In order to assist pumping the oil along the axial bore to the journal bearing, the bore preferably has parts of different diameters; the journal bearing being located in a wide-diameter part of the bore and the channels terminating in a narrow-diameter part. Thus once the oil has entered the bore, it is forced along the bore by centrifugal force.

Figure 2:
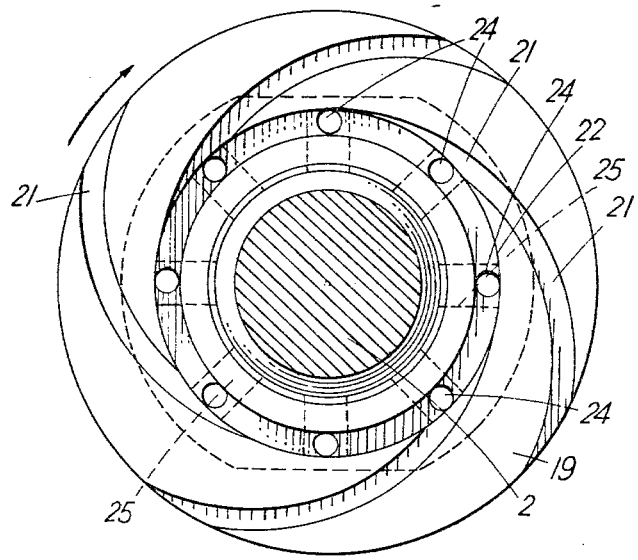
Figure 3:
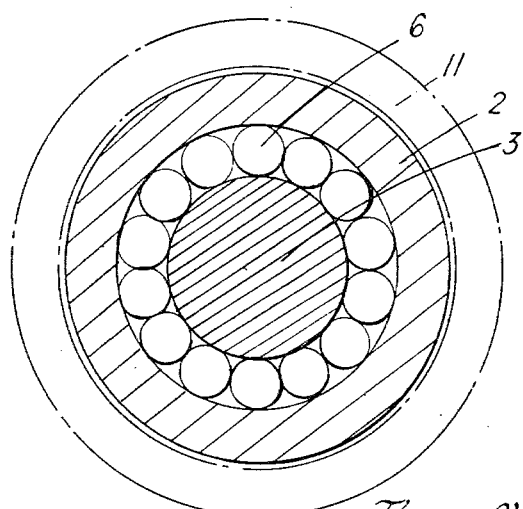

The scope of the monopoly is defined by the appended claims; the invention and how it may be performed will now be particularly described with reference to the accompanying drawings, in which:

FIGURE 1 is a section through part of a gearbox according to the invention;
FIGURE 2 is an end elevation of an impeller forming part of the gearbox, in the direction of the arrow in FIGURE 1; and
FIGURE 3 is a section on the line A—A in FIGURE 1.

The gearbox comprises a casing having a front cover 1, a drive shaft 2 driven by the engine, and a mainshaft 3 connected to a propeller shaft (not shown). The drive shaft 2 is supported by a ball bearing 4 in the casing; and the mainshaft 3 is supported by a journal bearing 5 in the form of two sets of crowded rollers 6 (FIGURE 3) mounted in a bore 7 of the drive shaft. One set of rollers 6 abuts against a shoulder 8 in the bore and the other set abuts against a thrust ring 9 held in position by a circlip 10.

The outer or right hand end of the drive shaft is formed as a pinion 11 which is in constant mesh with a gear and layshaft (not shown). A hub 12 is splined to the mainshaft 3, and a coupling sleeve 13 is slidable on the hub to engage either dog teeth 14 on the pinion 11 or dog teeth 15 on a pinion 16 rotatably mounted on the mainshaft 3 and in mesh with a gear on the layshaft (not shown). Conventional synchronizing cones 17 and 18 are mounted on the pinions 14 and 16 respectively.

The gearbox is a conventional synchromesh gearbox with five gear ratios. To engage fourth gear the coupling sleeve 13 is slid to the left to engage the dog teeth 14 so that there is direct drive between the drive shaft and mainshaft; to engage fifth gear the coupling sleeve 13 is slid to the right to engage the dog teeth 15 to establish overdrive between the drive shaft and the mainshaft. Fifth gear or overdrive, unlike the reduction gears 1st, 2nd and 3rd, is likely to be engaged for lengthy periods on motorways, and this means that there is relative rotation in the journal bearing 5 for lengthy periods. In order to minimize the risk of bearing failure, the journal bearing is, according to the invention, positively lubricated.

The lubrication arrangement for the journal bearing 5 comprises a pump impeller disc 19 screwed on to a threaded portion of the drive shaft 2, the threads being deformed locally after the impeller has been fitted, to lock the impeller in position. The impeller is so located on the shaft 2 that it also acts as a retainer for the inner race of the bearing 4. The impeller, which operates in a recess 20 in the front cover of the gearbox assembly, has a number of spiral grooves 21 formed in its surface adjacent a plane radially extending end wall of the recess 20. These grooves 21, which are shown in FIGURE 2, curve gently inwards from the periphery 23 of the impeller to an annular collecting channel 22 in the opposite direction to the normal direction of rotation of the drive shaft, this normal direction being indicated by an arrow in FIGURE 2. Each groove extends round about one-quarter of a circle from its outer to its inner end, thus giving a quick lead-in for the oil. The collecting channel 22 communicates through a plurality of axial channels 24 and radial channels 25 in the impeller with radial channels 26 in the drive shaft. The latter channels terminate in the bore 7. The bore 7 is divided by the shoulder 8 and by other shoulders into parts of different diameter: the radial channels 26 terminate in a narrow-diameter part 27, whereas the journal bearing 5 is located in a wide-diameter part 28.

The lower part of the periphery 23 of the impeller extends into an oil sump the base of which is formed by the radially outer wall of the recess 20 and the side walls of which are formed by the end wall of the recess 20 and the outer race 30 of the ball bearing 4.

The surface of the impeller in which the grooves 21 are formed and which is adjacent the plane radially extending end wall of the recess 20 may be spaced between .015 and .030 inch from the latter, if required, to accommodate end float in the drive shaft 2.

In operation, oil from the sump of the gearbox is splashed between the races of the ball bearing 4 into the oil sump in the recess 20, thus filling the oil sump to a height determined by the outer race of the bearing 4. As the drive shaft rotates, the outer ends of the grooves 21 scoop up oil; because of the drag on the oil by the plane stationary surface of the radially extending end wall of the recess 20 the rotary movement causes the oil to move inwardly along the grooves into the collecting channel 22. From the latter channel 22 the oil is forced into the narrow-diameter part 27 of the axial bore 7. The progressively increasing diameter of the bore 7 results in the oil flowing by centrifugal force to the right into the wide-diameter part 28 of the bore in which the crowded rollers 6 are located. The thrust ring 9 acts as a dam to maintain the level of oil in the wide-diameter part 28.

In a modification, oil is supplied to the oil sump in the recess 20 through a passage which is formed in the gearbox casing and terminates in the oil sump.

In another modification, some of the oil in the axial bore 7 enters an axial bore in the mainshaft and then, under the action of centrifugal force, flows outwards through radially extending bores in the mainshaft to lubricate the pinion 16 which is rotatably mounted on the mainshaft.

The invention also comprehends the oil pump itself: such a pump can be used for purposes other than that which has been particularly described, for example the pump can be used to establish a pumping circulation within the differential gears of a motor vehicle axle.

I claim:

1. A motor vehicle gearbox comprising a rotary input drive shaft, a main shaft journalled by a bearing in an axial bore in the drive shaft, a pump impeller disc which is fixed to the drive shaft and has in one face grooves extending with an inward component from the outer edge toward the center portion of the disc and with a circumferential component in the opposite direction to the normal direction of rotation of the drive shaft, a stationary oil sump into which part of the outer edge of the impeller disc extends, channels formed in the impeller disc and in the drive shaft for conducting oil from the grooves to said mainshaft journal bearing, and a plane stationary surface which is disposed adjacent the grooved face of the impeller disc and exerts a drag on oil scooped into the outer ends of the grooves such that the oil is moved inwardly along the grooves into the channels as the impeller disc rotates.

2. A gearbox according to claim 1, in which said channels include a circular collecting channel connected to the inner ends of the grooves, and other channels connecting the collecting channel to the axial bore.

3. A gearbox according to claim 2, in which the axial bore has parts of different diameter, the journal bearing being located in a wide-diameter part and the channels terminating in a narrow-diameter part.

4. A gearbox according to claim 1, in which the journal bearing comprises crowded rollers, one axial end surface of the rollers abuts a shoulder in the bore, and a ring fixed in the bore abuts the opposite end surface of the rollers and serves as a dam for maintaining an oil level in the bearing.

5. A gearbox according to claim 1, in which the plane stationary surface is an end wall of a recess in the gearbox casing in which the impeller disc is located, and the radially outer wall of the recess forms the base of the oil sump.

6. A gearbox according to claim 5, in which the impeller disc is located between the end wall of the recess and a bearing for the drive shaft, and the outer race of the latter bearing forms a wall of the oil sump.

7. A gearbox according to claim 6, in which oil from the gearbox reaches the oil sump through the said bearing.

8. A gearbox according to claim 6, in which oil from the gearbox reaches the oil sump through a passage in the casing.

9. An oil pump comprising a rotary drive shaft, an impeller disc which is fixed to the drive shaft and has in one face grooves extending with an inward component from the outer edge toward the center of the impeller disc and a circumferential component in the opposite direction to the normal direction of rotation of the drive shaft, a stationary oil sump into which part of the outer edge of the impeller disc extends, and a plane stationary surface disposed adjacent the grooved face of the impeller disc such that, as the impeller disc rotates, oil scooped into the outer ends of the grooves is moved inwardly along the grooves and means to conduct oil from the grooves to a point requiring lubrication.

10. An oil pump comprising a rotary drive shaft, an impeller disc which is fixed to the drive shaft and has a smooth circular outer edge and in one face grooves extending with an inward component from the outer edge toward the center portion of the impeller disc in the opposite direction to the normal direction of rotation of the drive shaft, channel means communicating with the inner ends of the grooves a stationary oil sump into which part of the outer edge of the impeller disc extends, and a plane stationary surface disposed adjacent the grooved face of the impeller disc such that, as the impeller disc rotates, oil scooped into the outer ends of the grooves is moved inwardly along the grooves into the channel means and means connecting said channel means to an output passage.

11. An oil pump according to claim 10, wherein the channel means which communicates with the inner ends of the grooves in the impeller disc comprises an annular collecting channel which is in communication with a plurality of channels which extend axially through the impeller disc.

12. An oil pump according to claim 10, wherein the grooves in the impeller disc are of a spiral shape.

13. An oil pump according to claim 12, wherein each groove extends round about one-quarter of a circle from its outer to its inner end.

14. In a drive mechanism, a stationary support housing having an annular chamber, said annular chamber having a sump, means to maintain a body of oil in said sump, an impeller member located in said annular chamber and mounted for rotation with respect to said housing about an axis of rotation, means connected to said impeller member to rotate said impeller member in a normal direction of rotation, said impeller member having a surface and an outer perimeter extending into said sump and contacting the body of oil, stationary surface means on said housing providing a stationary surface having a substantially constant clearance with respect to said impeller surface when the impeller member is rotating, groove means in said impeller surface having a scoop portion at the outer perimeter for scooping oil from said sump into said groove and into contact with said stationary surface and a pumping portion extending both inwardly toward the axis of rotation and in a direction opposite to the normal direction of rotation for moving the oil in frictional contact with said stationary surface toward said axis of rotation and rotating said oil about the axis of rotation insufficiently fast to cause it to move away from said axis of rotation, means requiring lubrication and passage means to convey oil from the inner portion of said groove means to said means requiring lubrication.

15. In a drive mechanism, a stationary support housing having an annular chamber, said annular chamber having a sump, means to maintain a body of oil in said sump, an impeller member located in said annular chamber and mounted for rotation with respect to said housing about an axis of rotation, means connected to said impeller member to rotate said impeller member in a normal direction of rotation, said impeller member having a surface and a smooth circular outer perimeter extending into said sump and contacting the body of oil, stationary surface means on said housing providing a stationary surface having a substantially constant clearance with respect to said impeller surface when the impeller member is rotating, groove means in said impeller surface having a scoop portion at the outer perimeter for scooping oil from said sump into said groove and into contact with said stationary surface and a pumping portion having a path for moving oil extending with respect to said impeller surface with both a vector extending inwardly toward the axis of rotation and a vector extending in a direction opposite to the normal direction of rotation for moving the oil in frictional contact with said stationary surface toward said axis of rotation and rotating said oil about the axis of rotation insufficiently fast to cause it to move away from said axis of rotation, means requiring lubrication and passage means to convey oil from the inner portion of said groove means to said means requiring lubrication.

References Cited by the Examiner

UNITED STATES PATENTS

| | | | |
|---|---|---|---|
| 1,914,498 | 6/1933 | Gardner | 184—31 |
| 2,247,732 | 7/1941 | Paton | 184—6 |
| 2,861,477 | 11/1958 | Mueller | 184—6 |

FOREIGN PATENTS 679,402  9/1952  Great Britain.

M. CARY NELSON, *Primary Examiner.*

MILTON KAUFMAN, LAVERNE D. GEIGER,
*Examiners.*